Patented Dec. 8, 1931

1,835,868

UNITED STATES PATENT OFFICE

GEORGE W. HEISE, OF LAKEWOOD, OHIO, ASSIGNOR TO NATIONAL CARBON COMPANY, INC., A CORPORATION OF NEW YORK

GALVANIC CELL

No Drawing. Original application filed May 15, 1925, Serial No. 30,612. Divided and this application filed June 3, 1930. Serial No. 459,114.

This invention relates to primary batteries and particularly to that type employing copper oxide and zinc as the electrodes with an alkaline electrolyte. The invention has for its principal object the reduction of the dissolved electrode metal concentration in the electrolyte for the purpose of increasing the service capacity of a given volume of the electrolyte.

By the use of the present invention the service characteristics of cells of the class above mentioned are improved to a marked degree. The improvement is particularly to be noted in the duration of effective service which can be obtained and it has been demonstrated that the useful life of a given volume of electrolyte of the average alkali primary cell may be increased as much as 30 to 40% and in some cases even more depending upon the amount of additional material employed.

The invention is based on the discovery that certain substances, which are not themselves appreciably soluble in a caustic alkali electrolyte, may combine or otherwise react with zinc or other metal dissolved therein to form insoluble products.

It is well known that in the operation of alkali cells of the type above mentioned the zinc electrode is gradually dissolved in the electrolyte. The concentration of zinc in the solution increases until the saturation point of the electrolyte solution is reached. If the operation of the cell be continued, the zinc will crystallize out and deposit in various places, including the active electrode substances. Due to this deposit the internal resistance of the cell rises until a point is reached where the voltage of the cell falls below that desirable for efficient operation.

According to the present invention a substance which serves to reduce the concentration of the zinc in the alkali electrolyte is introduced into the cell either at the time of putting the cell in service or at such time after the beginning of the operation of the cell as may be deemed expedient. Substances which have been found effective for the purpose intended are base-exchanging silicates such as the naturally occurring zeolites and permutite. Other such substances are given in my application Serial No. 30,612, filed May 15, 1925 and my application Serial No. 354,177, filed April 10, 1929. I have found that the zeolites are able to take up dissolved copper and hence reduce the zinc corrosion in assembled cells.

While it may appear somewhat surprising in view of the facts heretofore available concerning base-exchanging silicates that these reactions should take place in strong alkali solutions, the results above mentioned have been substantiated by tests. While the base-exchanging reaction is at times rather slow the slowness does not impair the usefulness of cells constructed in accordance with my invention, since such cells are ordinarily in service for sufficient periods of time to allow the reaction to proceed.

While the present invention has been described with particular reference to alkali cells using electrodes of zinc and copper oxides, it is to be understood that it is applicable to other types of primary cells employing acid or neutral electrolytes, and that the concentration of other metals than zinc and copper may be reduced.

It is to be understood that the improved results obtained by the present invention are not dependent upon the specific procedure described herein and that various modifications of my invention may be made within the scope of the appended claims.

This application is a division of my application Serial No. 30,612, filed May 15, 1925.

I claim:

1. An electrolyte for a galvanic cell comprising caustic alkali and a zeolite.

2. In a galvanic cell having a zinc electrode and a copper oxide electrode, a caustic alkali electrolyte having a base-exchanging silicate in contact with said electrolyte.

3. A primary galvanic cell having positive and negative electrodes, one of said electrodes being composed of zinc and a liquid caustic alkali electrolyte, said cell also containing a zeolite in contact with said electrolyte.

4. An electric cell of the copper oxid type having a positive electrode and negative electrode and a liquid caustic alkali electrolyte, said cell also containing zeolite material in contact with said liquid.

5. An electric cell of the copper oxid type having positive and negative electrodes and a liquid caustic alkali electrolyte, said cell also containing in contact with said liquid a zeolite of the water purifying type containing reactive alumina and reactive silica.

6. An electric cell of the copper oxid type having a positive electrode, a negative electrode, and a liquid caustic alkali electrolyte, said cell also containing in contact with said liquid a solid material containing silica in reactive hydrated form.

7. An electric cell of the copper oxid type having a positive electrode, a negative electrode and a liquid caustic alkali electrolyte, said cell also containing in contact with said liquid a solid material containing alumina in hydrated reactive form.

8. An electric cell of the copper oxid type having a positive electrode, a negative electrode, and a liquid caustic alkali electrolyte, said cell also containing silica in reactive hydrated form and alumina in hydrated reactive form, said silica and said alumina existing in the form of a zeolite.

9. A galvanic cell electrolyte comprising caustic alkali and a base-exchange silicate.

In testimony whereof, I affix my signature.

GEORGE W. HEISE.